Sept. 11, 1934.  F. H. ADAMS  1,973,133
MACHINE FOR CUTTING SPIRAL BEVEL GEARS
Filed May 6, 1931  5 Sheets-Sheet 1

INVENTOR:
FRANK H. ADAMS
By Kwis Hudson & Kent
ATTORNEYS

Sept. 11, 1934.   F. H. ADAMS   1,973,133
MACHINE FOR CUTTING SPIRAL BEVEL GEARS
Filed May 6, 1931   5 Sheets-Sheet 2

INVENTOR:
FRANK H. ADAMS
By Kwis Hudson & Kent
ATTORNEYS.

Sept. 11, 1934.    F. H. ADAMS    1,973,133
MACHINE FOR CUTTING SPIRAL BEVEL GEARS
Filed May 6, 1931    5 Sheets-Sheet 3
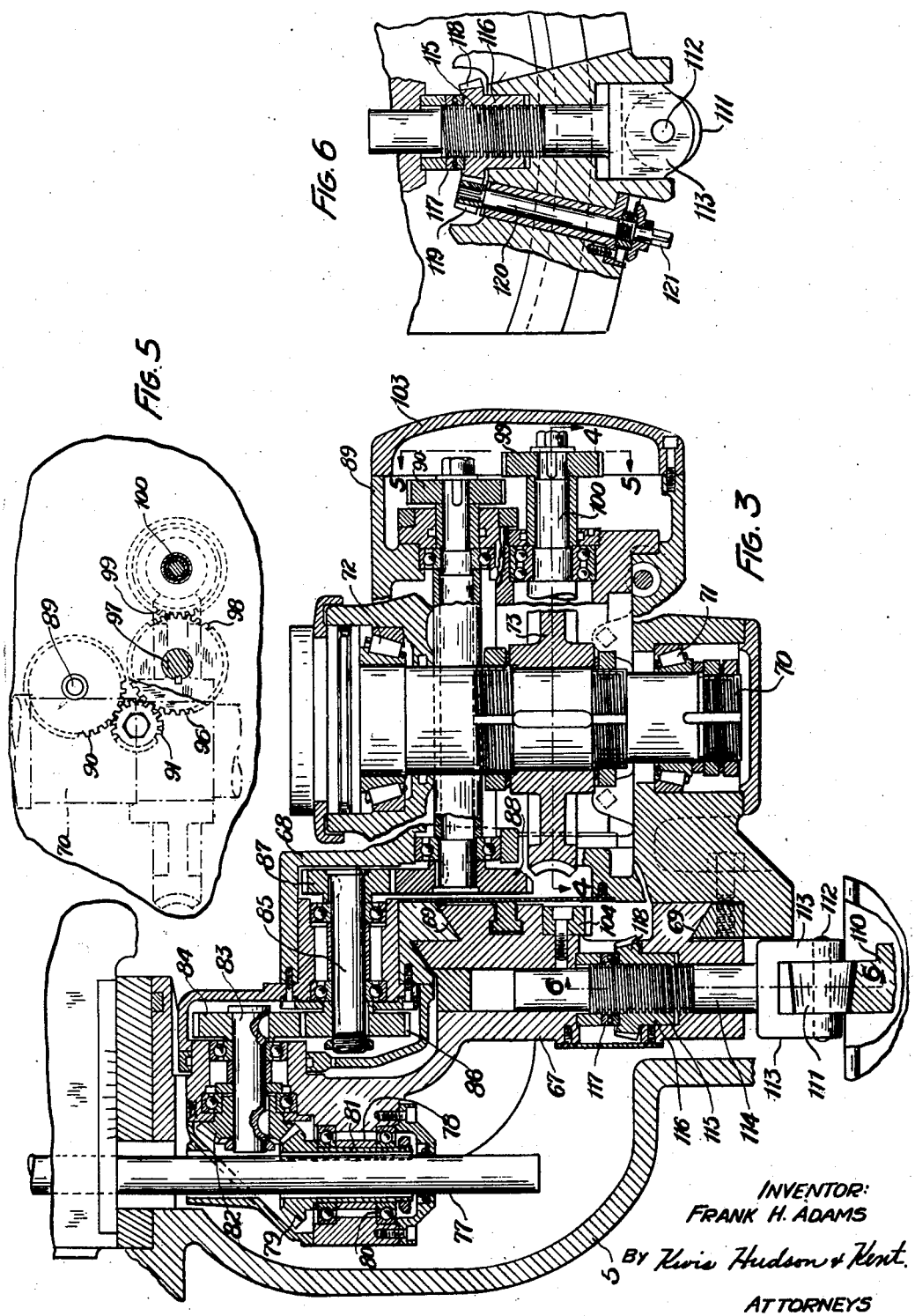
INVENTOR:
FRANK H. ADAMS
BY Kwis Hudson & Kent.
ATTORNEYS Sept. 11, 1934.    F. H. ADAMS    1,973,133
MACHINE FOR CUTTING SPIRAL BEVEL GEARS
Filed May 6, 1931    5 Sheets-Sheet 4
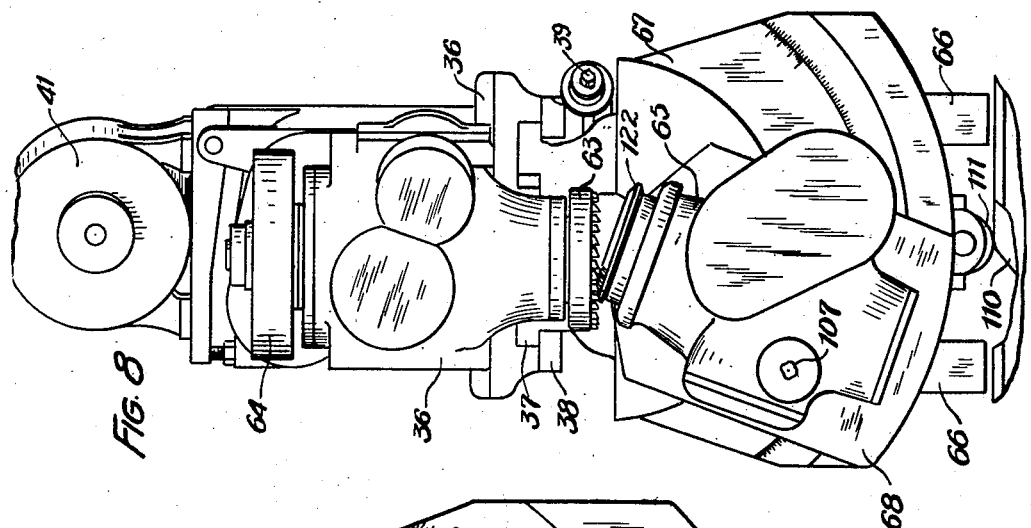
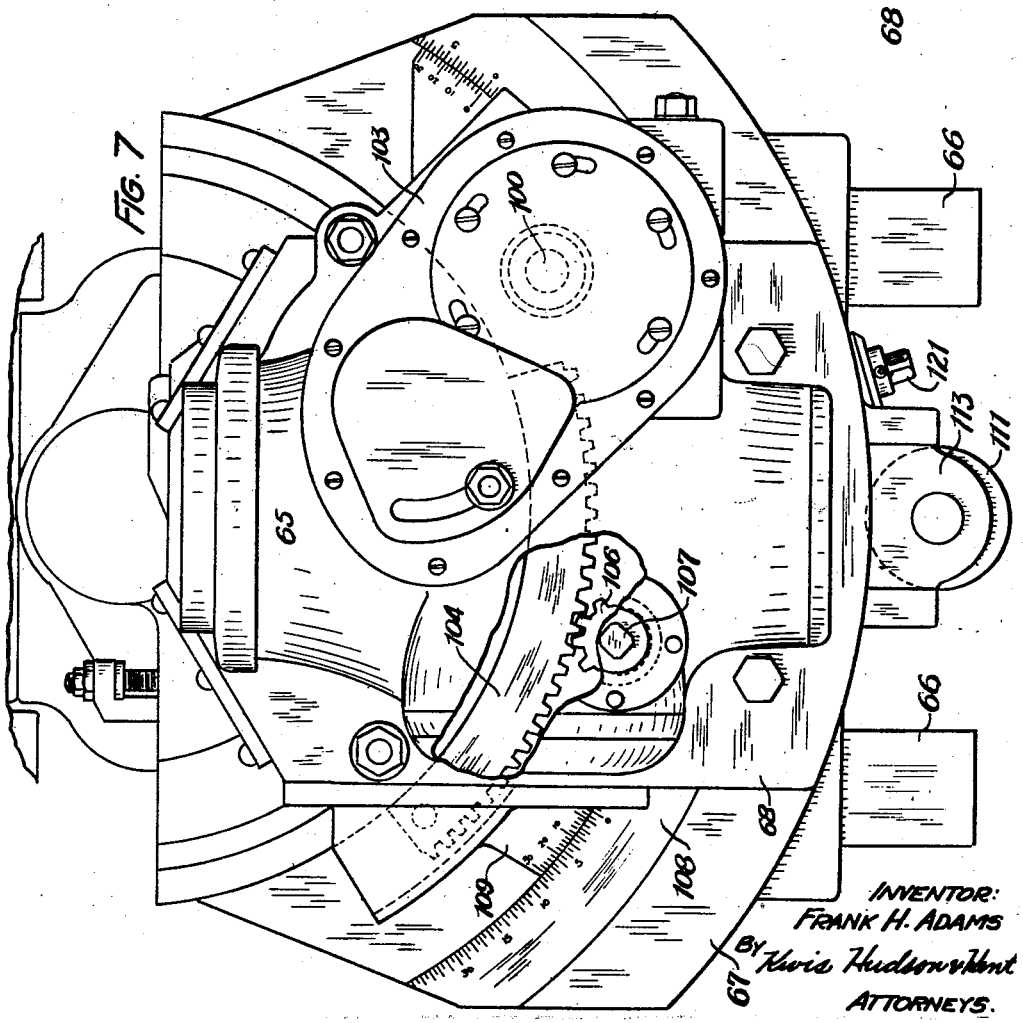
INVENTOR:
FRANK H. ADAMS
BY Kwis Hudson Kent
ATTORNEYS.

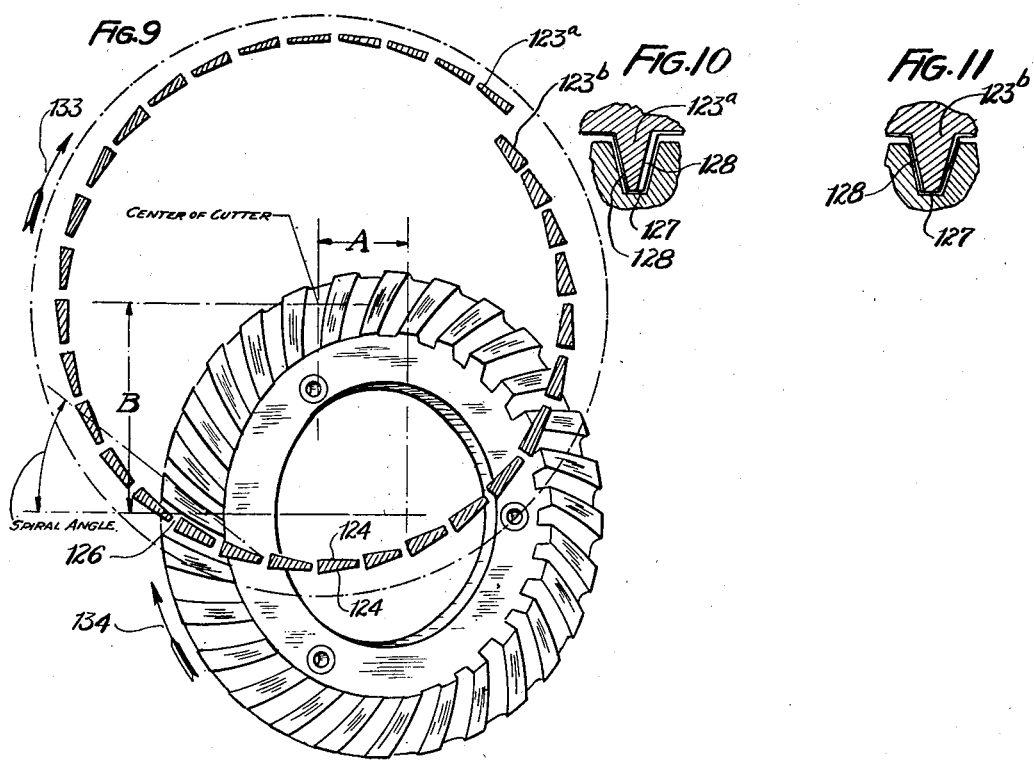
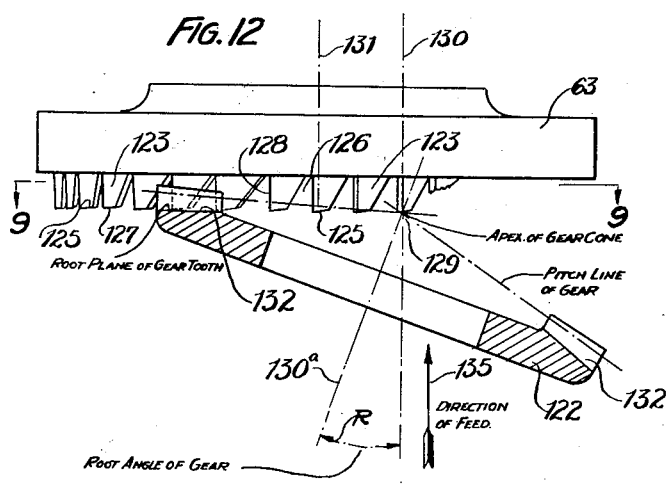

Patented Sept. 11, 1934

1,973,133

UNITED STATES PATENT OFFICE 1,973,133

MACHINE FOR CUTTING SPIRAL BEVEL GEARS

Frank H. Adams, Cleveland Heights, Ohio

Application May 6, 1931, Serial No. 535,340

21 Claims. (Cl. 90—4)

The present invention relates to a machine for cutting spiral bevel gears, the preferred embodiment of which will be described herein in connection with a turret type of multiple unit or spindle machine corresponding in certain of its structural details to the multiple spindle hobbing machine shown in the patent to Sommer and Adams No. 1,732,700, granted October 22, 1929. It is to be understood, however, that, although the machine shown and described herein is of the multiple unit or spindle type, insofar as the construction of the tool and work heads of each unit of the machine is concerned, the machine could well be of the single unit or spindle type, and, the invention in certain of its aspects, relates to such a machine, as well as to the multiple spindle type of machine.

An object of the invention is to provide an improved machine for cutting spiral bevel gears, and particularly a machine for cutting such gears wherein the cutter and gear blank are rotated in continuous cutting engagement with each other and are given the requisite relative movements to effect complete cutting of the teeth in the blank.

An additional object is to provide a machine for cutting spiral bevel gears wherein the same machine and cutter may be used to cut gears of the same circular pitch but having various angles of bevel and numbers of teeth, by adjustment of the relative angular position of the cutter head spindle and gear blank spindle, and by providing suitable relative speeds of rotation for the cutter and gear blank.

A still further object of the invention is to provide a machine for cutting spiral bevel gears which is efficient in operation, simple in construction, and in which the necessary adjustments between the cutter and work heads can be readily and quickly obtained.

A still further object of the invention is to provide a machine for cutting spiral bevel gears wherein means is provided for quickly and accurately adjusting the relative angular position of the cutter and gear blank axes and for obtaining the proper relative speeds of rotation of the cutter and gear blank, to enable the machine to cut gears of the same circular pitch but of various angles of bevel and numbers of teeth without necessitating changing the cutter.

Additional objects and advantages of the invention will appear more fully hereinafter from the following description thereof described with reference to the accompanying drawings illustrating the preferred embodiment of the invention, in which:

Fig. 3 is an irregular vertical sectional view through one of the work heads;

Fig. 5 is a detail view, partly in section and partly in elevation, taken substantially on line 5—5 of Fig. 3, looking in the direction of the arrows;

Fig. 6 is a vertical sectional view taken on line 6—6 of Fig. 3, looking in the direction of the arrows;

Fig. 7 is a fragmentary front elevational view of the work head, shown in Fig. 3 certain portions being broken away and shown in section;

Fig. 8 is an elevational view of one of the tool and work head units of the turret of the machine;

Fig. 9 is a sectional view on line 9—9 of Fig. 12, and

Figure 1:
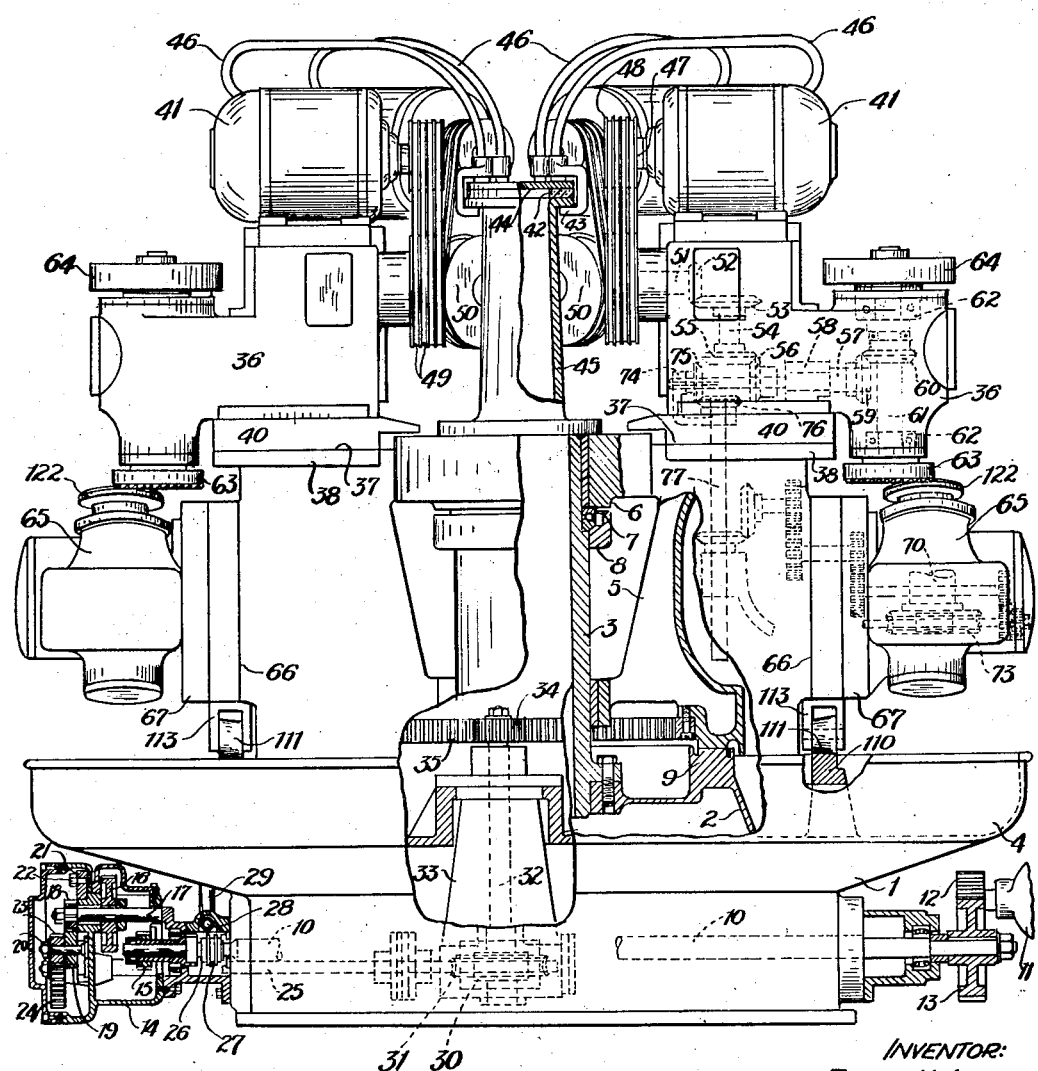
Figure 1 is an elevational view of a multiple spindle machine with certain portions broken away and shown in section.

Figs. 10, 11, and 12 are views showing the relationship between the cutter and gear blank.

As previously pointed out, the invention insofar as the machine is concerned, although applicable to a single spindle machine, is shown in the accompanying drawings embodied in a multiple spindle machine, the operating mechanism of which is mounted upon a fixed circular base 1 provided with a solid bottom forming a drip pan 2 to catch any lubricant dripping from the cutter. Rigidly secured to the base 1 at the center thereof, is a vertical hollow column 3, and at the periphery of the base there is mounted an annular drip trough 4 which has openings in the bottom thereof to permit lubricant to drain into the pan 2.

A rotary turret 5 is mounted upon the column 3 and has a central bearing sleeve 6 which fits upon the top of the post 3 and is supported by a thrust bearing 7 which is adjustably supported on the column 3 by an adjusting collar 8. Outwardly from the central column 3 the turret rotates upon a bearing surface 9 carried by the base 1.

A drive shaft 10 driven from any suitable source of power, such as the motor 11, provided with a pinion 12 in mesh with a gear 13 on the drive shaft 10, extends through the base 1 and into a gear case 14 at one side of the base. Within the gear case 11 there is a speed reducing gear train consisting of a gear 15 on the shaft 10 which meshes with a gear arranged on a countershaft in the casing, such countershaft having fixed thereto a second gear which meshes with a large gear 16 arranged in a second countershaft 17, such second countershaft having a small gear 18 fixed thereto. In the sectional view of the gear case 11 shown in Fig. 1, the first mentioned countershaft and its gears are not illustrated and they have not been shown in any other views of the drawings of the present application since they are clearly illustrated and described in my copending application, Serial No. 394,424, filed September 23, 1929, and the construction of the gear casing and the gear train therein forms no part of the present invention.

The gear 18 meshes with a gear 19 fixed on a shaft 20 which is carried by a bracket 21 adjustably supported by the gear casing by means of a bolt 22 extending through a slot in the bracket and anchored at its end in the casing. A second gear 23 is fixed to the shaft 20 and meshes with a large gear 24 on a shaft 25 which extends into the base parallel with the shaft 10.

Inwardly of the gear 15 the shaft 10 is provided with a clutch 26 by means of which the rotation of the turret 5 may be controlled, such clutch being actuated to engaged and disengaged position by means of a shifting yoke 27 fixed on a shaft 28 arranged horizontally in the clutch housing and oscillated by means of an actuating lever 29 secured to its end. The shaft 25 is driven at a much lower rate of speed than the main driving shaft 10 and operates gearing for rotating the turret 5. This gearing includes a worm 30 arranged on the shaft 25 in mesh with a worm wheel 31 fixed on a vertical shaft 32 rotatably mounted in a post 33 in the base of the machine, and a pinion 34 fixed on the upper end of the vertical shaft 32 in mesh with a large internal gear 35 fixed to the turret 5. It will thus be seen that the gear train for rotating the turret is such that the rotation is relatively slow for reasons well understood by those skilled in the art. Of course, in the case of a single spindle machine where the turret is not required, it is necessary to merely employ a drive means for rotating a cam track later to be explained.

The slowly rotating turret 5 supports the tool and work head units of the machine, there being six such units illustrated herein, although, of course, the number of units can vary. Each tool head of each unit is indicated generally at 36, and is slidably mounted on the turret upon horizontal ways 37 for adjustment radially of the turret axis of the machine for a reason later to be explained. Each tool head is held in position on such ways by gibs 38 and movable radially inwardly and outwardly relative to the center of the turret by means of an adjusting screw 39, the construction and operation of which is well understood in the art and is fully disclosed in my above mentioned Patent No. 1,878,656. Each work head 36 is also provided with a suitable scale 40 bearing the proper indicia and cooperating with a zero mark on the turret to indicate the radial position of the tool head. As previously mentioned, there are six of these tool heads in the machine disclosed and they are spaced circumferentially of the turret and can be moved radially inwardly and outwardly toward the center of the turret to adjust the axes of the cutters carried thereby with respect to the axes of the gear blanks on the work heads, as will later be explained.

Although the tool spindles may be driven from the main drive shaft 10 as in the above mentioned Patents No. 1,732,700, and No. 1,878,656, it is proposed in the particular machine disclosed herein to employ a separate drive for the tool and work spindles of each unit of the machine, and to this end a motor 41 is mounted on each of the tool heads 36. Current may be supplied to the motors 41 in any suitable manner, as for example, by brushes 42 carried by a rotatable support 43 and engaging a contact plate 44 connected to a source of current supply and arranged on the upper end of a column 45 supported upon the vertical hollow column 3. The brushes 42 are connected to the motors by suitable leads extending through conduit pipes 46 and the return circuit may be through a ground connection.

The motor shafts 47 of the motors 41 extend radially inwardly toward the center of the machine and are each provided with a driving pulley 48; a belt 49 travels around such pulley and a driven pulley 50 fixed to the inner end of a rotatable shaft 51 carried by the tool head 36 and extending radially outwardly of the machine. The shaft 51 has at its outer end a bevel gear 52 meshing with a bevel gear 53 fixed on a vertical shaft 54 rotatable in suitable bearings (not shown) in the tool head. The lower end of the vertical shaft 54 has fixed thereto a bevel gear 55 meshing with a bevel gear 56 fixed on a horizontally extending shaft 57 rotatably mounted in a bearing 58 in the tool head, the outer end of the shaft 57 having fixed thereto a bevel gear 59. The bevel gear 59 meshes with a bevel gear 60 fixed on a vertically extending shaft 61 and intermediate the ends of such shaft. The shaft 61 is rotatably mounted in bearings 62 provided in the tool head and extends outwardly of the tool head at its upper and lower ends. A tool or cutter 63 is secured on the lower end of the shaft 61 by means well known in the machine tool art, and a fly or balance wheel 64 for eliminating excess vibration is fixed to the upper end of the shaft 62.

Each work head of each unit is indicated generally at 65 and is slidably supported upon vertical ways 66, parallel to the turret axis and the tool spindle axis and formed on the turret 5. Each work head comprises a portion 67 slidable on the ways 66 and a portion 68 carrying the work spindle and swivelled upon the portion 67 on arcuate concentric guideways 69 formed on such portion. The work spindle is shown at 70, being supported at its opposite ends in suitable bearings 71 and 72 and having fixed thereto, intermediate its ends, a worm wheel 73. The work spindle 70 is driven by the motor 41 through the driving connections now to be described.

The shaft 57 in the tool head 36 extends rearwardly and passes loosely through a bracket 74 secured to the turret 5 and extending upwardly between the ways 37 and an opening formed in the under side of the tool head. A bevel gear 75 slidably keyed to the shaft 57 so as to permit relative movement between said gear and shaft upon radial adjustment of the tool head is held between the bracket 74 and a bevel gear 76 arranged on the upper end of a vertically extending shaft 77 rotatably supported in the turret 5.

The portion 67 of the work head is provided with an inwardly extending bearing sleeve 78 in which is rotatably mounted, upon suitable bearings 80, a bevel gear 79 provided with an elongated sleeve 81 slidably keyed to the shaft 77 to operatively connect the gear 79 with such shaft while permitting vertical movement of the work head. The bevel gear 79 meshes with a bevel gear 82 fixed on a countershaft 83 carried by the portion 67 of the work head, the opposite end of such shaft 83 having a spur gear 84 fixed thereto. A countershaft 85 is rotatably supported in suitable bearings carried by the portion 68 of the work head and has fixed thereto at its inner end a gear 86 meshing with the gear 84 and at its outer end a gear 87 which in turn meshes with a gear 88 fixed on a shaft 89 extending outwardly through the portion 68 of the work head, as clearly shown in Figs. 3 and 5.

Figure 4:
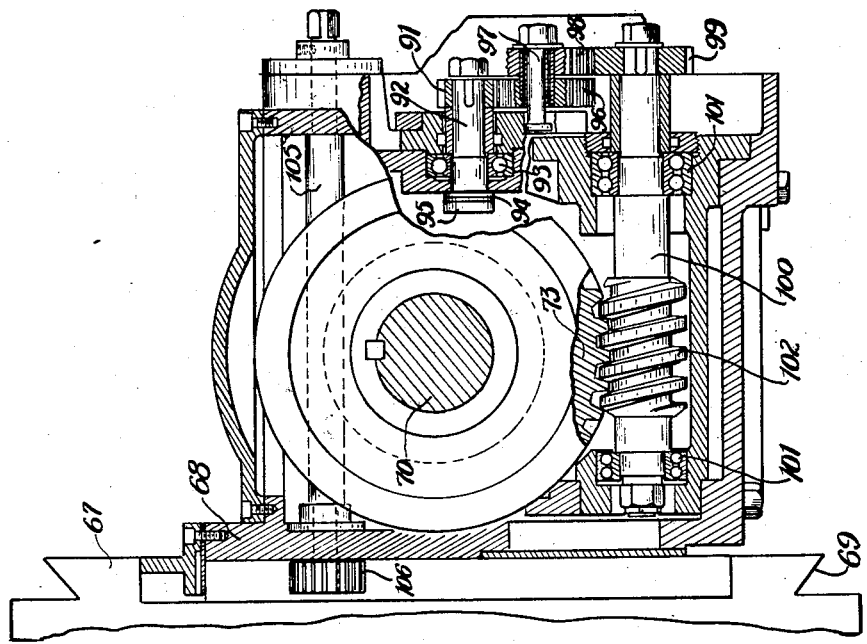
Fig. 4 is a horizontal sectional view through the work head shown in Fig. 3 and is taken substantially on line 4—4 of Fig. 3, looking in the direction of the arrows.
Figure 2:
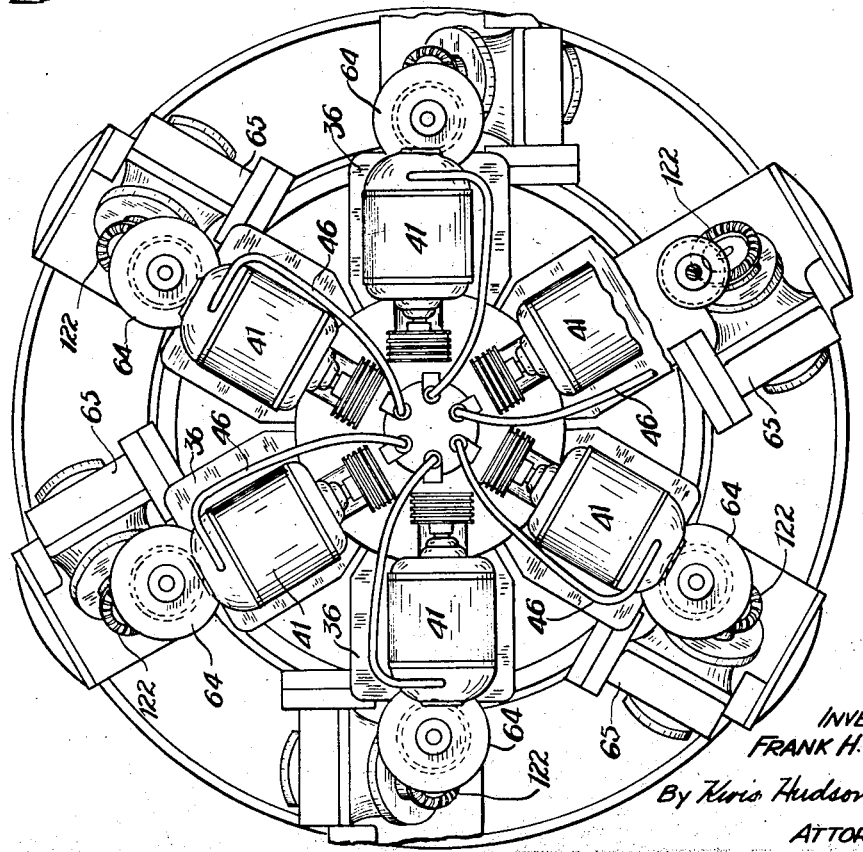
Fig. 2 is a top plan view of the machine.

The shaft 89 lies closely adjacent one side of the work spindle and a gear 90 fixed to its outer end meshes with a pinion 91 fixed on a stub shaft 92 rotatably supported in the front side of the work head and located nearer the center line of the work spindle than is the shaft 89. The stub shaft 92 is supported in bearings 93, as shown in Fig. 4, while a suitable thrust collar or thrust bearing 94 is interposed between the work head housing and the head 95 of the shaft 92. The pinion 91 meshes with a gear 96 fixed on a second stub shaft 97 carried by the work head housing, as clearly shown in Figs. 4 and 5, the axis of the shaft 97 is located to the right of the axis of the shaft 89, as viewed in Fig. 5. A second gear, indicated at 98, is fixed on the shaft 97 in front of the gear 96, and meshes with a gear 99 fixed to the worm shaft 100 which extends through the work head radially inwardly of the machine and is located on the same side of the axis of the work spindle 70 as is the shaft 89, although below and to the right thereof, as viewed in Fig. 5. The worm shaft 100 is supported in suitable bearings 101 adjacent its opposite ends and has either integral therewith or fixed thereto a worm 102 arranged intermediate the bearings 101 for the shaft 100 and meshing with the worm wheel 73 on the work spindle.

It will be seen from the foregoing description that the work spindle 70 is driven from the motor 41 and that the driving connections therefor are such as to permit the radial inward and outward adjustment of the tool head and also the vertical movements of the work head and the angular swivel movement of the portion 68 of the work head, this last movement merely causing the gear 86 to travel around the circumference of the gear 84. As will be explained more in detail later, the gear train for driving the work spindle is so selected that the ratio of rotation between the tool spindle and the work spindle will be one divided by the number of teeth to be cut in the gear blank, that is, the tool spindle rotates as many times faster than the work spindle as there are teeth in the gear blank, all of which will be more fully explained hereinafter.

The portion 68 of the work head is provided on its outer side with a removable cover plate 103 to give access to the gears 90, 91, 96, 98 and 99 so that these gears may be removed and another set of gears of suitable ratio substituted therefor when it is desired to cut gears having a different number of teeth than the number of teeth in the gears cut on the machine when using the train of gears just above mentioned for rotating the work spindle. In other words, by changing the gear train in the work head the proper relative speeds of rotation of the cutter and gear blank are obtained to enable gears of the same circular pitch but having various numbers of teeth to be cut on the machine.

It being necessary, as will be more fully pointed out hereinafter, to angularly adjust the relative angular positions of the axes of the tool spindle and the work spindle to cut gears having different angles of bevel, the portion 68 of the work head, as had been previously mentioned, is swivelly mounted with respect to the portion 67 of the work head upon the concentric arcuate guide ways 69 formed on the portion 67. In order to facilitate the adjustment of the work spindle and to enable the operator to readily move or adjust the portion 68 of the work head upon the arcuate guide ways 69, on the work head portion 67, the portion 67 has secured thereto, intermediate the guide ways 69 and concentric therewith, an arcuate rack 104, while the portion 68 has rotatably mounted therein a shaft 105 located on the opposite side of the work spindle to the worm shaft 100 and below the plane of said worm shaft, the shaft 105 extending through the rear side of the portion 68 and having a pinion 106 secured on its rear end and arranged to mesh with the rack 104. The other end of the shaft 105 extends outwardly through the front side of the portion 68 of the work head and has a squared wrench receiving end 107, whereby the operator of the machine may readily turn the shaft 105 in the proper direction to swing the portion 68 of the work head relative to the portion 67 thereof, to obtain the desired angular relationship between the work spindle and the tool spindle axes. The portion 67 of the work head is provided with an arcuate scale 108 cooperating with a complementary scale 109 carried by the portion 68, these scales bearing suitable graduations and indicia to indicate the angular position of the axis of the work spindle with respect to the axis of the tool spindle.

Since the cutter and the gear blank during the entire operation are continuously rotated in cutting engagement, it is necessary to provide a relative feeding movement between the cutter and blank so that the former can cut teeth on the blank of the proper tooth depth and to this end it is proposed to move the work head axially of or towards the cutter spindle. Accordingly the base 1 of the machine has arranged thereon a circular cam track 110 (see Figs. 1 and 3) arranged concentrically with respect to the turret axis and provided with proper varying contours on its upper surface to raise and lower the work heads of each unit during the rotation of the turret through the medium of a roller 111 carried by each of the vertically moving work heads. This arrangement is similar to the arrangement shown in the above mentioned Patents No. 1,732,700, and No. 1,878,656, and therefore need not be described herein in detail, it being sufficient to state that the contour of the cam track is preferably such that each work head will be raised by successive steps until the cutter teeth have cut the interdental spaces of the gear blank to the desired root plane and will then be lowered to separate the cutter and blank and permit the loading operation. Of course in the case of a single spindle machine, wherein the tool and work heads are not mounted on the rotating turret, a similar cam track could be employed and suitable actuating means provided for rotating the cam track to furnish the necessary displacement of the work head axially of the cutter spindle.

As previously stated each work head is provided with a roller 111 arranged to travel on the upper surface of the cam track 110. This roller 111 is rotatably mounted on a pin 112 supported in the arms 113 of a fork carried by the lower end of a screw shaft 114 mounted in the portion 67 of the work head and arranged for vertical adjustment therein. In order to obtain this vertical adjustment of the shaft 114 the same is provided with screw threads 115 intermediate its ends and a threaded adjusting nut 116 is rotatably arranged on the threaded portion 115 of the shaft, with a suitable thrust bearing 117 being provided to take the upward thrust of the nut 116. The nut 116 has formed integral therewith a beveled gear 118 which meshes with a bevel pinion 119 (see Fig. 6) fixed to the upper end of a downwardly and diagonally extending rotatable shaft 120 suitably mounted in the portion 67 of the work head and having at its outer and lower end a wrench receiving portion 121 whereby the operator of the machine may apply a wrench to the shaft 120 and by rotating the same in the proper direction raise or lower the shaft 114 to adjust the vertical position of the roller 111 to obtain the initial cutting relationship between the cutter and gear blank.

The machine of the present invention is particularly adapted to the cutting of spiral bevel gears, that is, bevel gears wherein the interdental spaces and teeth are curved from end to end upon the arcs of spirals although other types of gears may be cut thereby. In the drawings the gear blanks are indicated at 122 and are shown as having finished or partly finished teeth. The blanks are secured coaxially upon the work spindles 70 in any well known or preferred manner.

Referring to Figs. 9 to 12 inclusive of the drawings, the relative positions of the cutter 63 and gear blank 122 are indicated somewhat diagrammatically. The cutter 63 comprises an annular disk-like member from one face of which extend the cutting teeth 123 in a direction generally parallel to the axis of rotation of the cutter. The cutting teeth 123 constitute a series of teeth arranged on a spiral, the lead of which approximates the circular pitch of the gear to be cut. As illustrated the series includes only one turn of the spiral with the first and last of the series (indicated at 123a and 123b, respectively), adjacent each other and separated a distance, measured radially of the member approximately equal to the circular pitch of the gear to be cut.

The teeth 123 of the spiral series of cutting teeth increase in width or thickness from one end of the series to the other end thereof, that is the first tooth 123a of the series is the narrowest and the last tooth 123b is the widest or thickest, with the intermediate teeth of the series of gradually varying width. The sides of each cutting tooth taper inwardly toward each other, as indicated by the lines 124, and the ends of each tooth are formed with the necessary rake, as indicated at 125 Fig. 12; the taper 124 and rake 125 with the transverse gashes 126 between the teeth give the required clearance for the cutting action of the teeth, as they pass through the tooth spaces of the gear blank. The junction of the sides and end faces of the teeth with the front face thereof form the cutting edges 127 and 128. The transverse width of the teeth including the plane including the cutting edges 127 and 128 gradually increases from the first tooth 123a to the last tooth 123b of the spirally arranged series of teeth 123, in other words the distance of the cutting edges from a theoretical spiral which passes through the center of a theoretical cutting frustum gradually increases towards the rear tooth.

The gear blanks 122 are conical blanks of suitable form, according to the character of the gear to be cut, and are mounted on the work spindles 70 with the apex of each of the gear cones lying in the line of the axis of a work spindle 70. As the tool and work rotate in the directions indicated, the width of the theoretical cutting frustum which will pass through the ultimate interdental spaces of the gear being cut and stay within the confines thereof will vary, and as illustrated only a small portion of the theoretical frustum is used and the teeth actually employed vary somewhat therefrom. Assuming, for the purposes of illustration, that teeth were located along the entire theoretical frustum it will be apparent that the teeth at the end of the frustum of largest radius would cut diagonally across the interdental spaces in one direction and the teeth at the end of the frustum of smallest radius would cut diagonally across the interdental spaces in an opposite direction, and that a tooth intermediate the ends of the frustum can be made to cut both sides of an interdental space on an intermediate radius. The path of any particular tooth of the cutter, with reference to the gear blank, is varied from that of a circular arc because of the rotation of the blank.

The operator of the machine by means of the rotatable shaft 105 and rack 104 and pinion 106 swings the portion 68 of the work head to its proper angular position, the scales 108 and 109 giving the operator the reading indicating this position. In the embodiment of the invention illustrated the angular position of the portion 68 of the work head is computed in accordance with the root angle or angle of bevel of the gear to be cut, and is equal to the angle of bevel of the gear, but it is to be understood that the angle may be varied from that shown as desired. The angular position of the gear blank with respect to the cutter is shown in Fig. 12, wherein 129 indicates the apex of the gear cone, 130 the axis of the gear blank and work spindle when the same is parallel to the cutter spindle or axis 131, 130a the axis of the blank and work spindle when angularly adjusted with respect to the cutter axis 131, and R the angle included by axes 130 and 130a, which is the root angle or angle of bevel of the gear. The root plane of the teeth of the gear is indicated at 132 and the gear is positioned so that the root plane of the gear teeth at the point where the cutter teeth pass through the blank is perpendicular to the cutter axis. The adjustment of the angular position of the portion 68 of the work head causes the gear blank to swing about a point 129, which coincides with the apex of the gear cone an amount equal to the root angle of the gear tooth. Since the axis of the cutter is normal to the root plane of the teeth of the gear, the interdental spaces increase in width towards the periphery of the gear blank.

The cutter head 36 is adjusted radially of the machine by means of the adjusting screw 37 to offset the axis 131 of the cutter with respect to the axis 130 of the blank, as indicated at A in Fig. 9, so that the teeth of the cutter will have the proper cutting relationship with the gear blank. The offset position of the cutter center with respect to the work center is dependent upon the spiral angle and is a combination of the angular setting of the work spindle and the radial setting of the cutter spindle, which two settings are indicated in Fig. 9 by offsets "A" and "B" in relation to the work center.

The work head is adjusted vertically, by means of the adjustable roller 111, to bring the first tooth 123a of the cutter into the initial cutting position with respect to the blank. After this adjustment, the machine is in condition to be operated and the gear cut by the cutter.

The operation of the machine causes the cutter to be rotated in the direction indicated by the arrow 133 and the gear blank also to rotate in the same direction, as shown by the arrow 134, (see Fig. 9). The rates of rotation of the cutter and blank are in the ratio of the number of teeth in the gear to be cut to one, that is, if there are twenty-two teeth in the gear to be cut the cutter will rotate twenty-two times to every one revolution of the gear blank.

The rotation of the cutter and blank in cutting engagement causes the first and narrowest tooth 123a of the cutter to mill out a shallow spiral groove across the gear blank and diagonally across the ultimate interdental space, the succeeding teeth 123 of the series of teeth each widening the groove until the last and widest tooth 123b has passed through. As the last tooth 123b is passing through the groove, the first tooth 123a commences to cut a second groove or intermediate space. This action is repeated until spiral grooves have been cut completely around the blank, corresponding in number to the interdental spaces of the gear. The rotation of the cutter and blank in cutting engagement continues until the cutting edge 127 of the cutter teeth has reached the root plane of the gear teeth, it being remembered that the blank has been fed toward the cutter in a direction parallel to the cutter axis (see 135, Fig. 12) by means of the cam track 110, roller 111 and vertically movable work head.

The configuration of the plane included by the cutting edges 127 and 128 of the last tooth 123b of the cutter is complementary to the interdental spaces of the gear, with the result that both faces of the gear teeth are formed in the same operation.

It should be understood that the arrangement of the cutter teeth could be reversed, that is, the inner tooth of the series could be the narrowest and the outer tooth the widest, provided the cutting edges and the direction of rotation of the blank and cutter were reversed.

Although the invention is illustrated and described herein in connection with one form of machine, it should be understood that the invention may be embodied in various forms of machines capable of providing the necessary relative movement and adjustments between the cutter and blank, and that the invention is susceptible of such modifications and adaptations as come within the scope of the appended claims.

Having thus described my invention, what I claim is:

1. In a gear cutting machine, a rotatable turret, a plurality of units carried by said turret and each comprising a rotatable cutter spindle, a face type cutter supported on said cutter spindles, a rotatable work spindle, means for rotating said spindles at predetermined relative speeds, means for producing relative movement between said work spindle and said cutter spindle in a direction parallel to the axis of one of said spindles, and means for adjusting one of said spindles angularly with respect to the axis of the other spindle.

2. In a gear cutting machine, a rotatable turret, a plurality of units carried by said turret and each comprising a rotatable cutter spindle, a rotatable work spindle, means for rotating said spindles at predetermined relative speeds, means for moving said cutter spindle transversely of its axis, means for moving said work spindle relative to said cutter spindle in a direction parallel to the axis of the latter, and means for adjusting said work spindle angularly with respect to the axis of the cutter spindle.

3. In a gear cutting machine, a rotatable turret, a plurality of units carried by said turret and each comprising a rotatable cutter spindle, a rotatable work spindle, means for rotating said spindles at predetermined relative speeds, means for adjusting said cutter spindle transversely of its axis, means for moving said work spindle in a direction parallel to the axis of the cutter spindle, and means for adjusting the work spindle to dispose its axis angularly with respect to the cutter spindle axis.

4. In a gear cutting machine, a rotatable turret, a plurality of units carried by the turret and each comprising a rotatable cutter spindle, a face type cutter supported on said cutter spindles, a rotatable work spindle, means for rotating said spindles at predetermined relative speeds, means for relatively adjusting said spindles transversely of their axes, means for relatively moving said spindles in a direction perpendicular to said transverse movement of adjustment, and means for relatively adjusting angularly the axes of said spindles.

5. In a machine of the character described, the combination of a base, a turret rotatably supported by said base, means for rotating said turret, a plurality of cutter spindles rotatably supported by said turret, face type cutters supported on said cutter spindles, a plurality of work spindles rotatably supported by said turret, said work spindles being paired with said cutter spindles, independent means for moving certain of said spindles radially of the axis about which said turret rotates, and a common means for moving other of said spindles parallel to the axis about which said turret rotates.

6. In a machine of the character described, the combination of a base, a turret rotatably supported by said base, means for rotating said turret, a plurality of cutter spindles rotatably supported by said turret, the axis of said cutter spindles being parallel with the axis about which said turret rotates, a plurality of work spindles rotatably supported by said turret, said work spindles being paired with said cutter spindles, means for adjusting one of said spindles transversely of the axis about which said turret rotates, means for adjusting one of said spindles about an axis normal to the axis about which said turret rotates, and independent means for rotating each pair of cutter and work spindles at predetermined speeds relative to each other.

7. In a machine of the character described, the combination of a base, a turret rotatably supported by said base, means for rotating said turret, a plurality of cutter spindles rotatably supported by said turret, the axis of said cutter spindles being parallel with the axis about which said turret rotates, a plurality of work spindles rotatably supported by said turret, said work spindles being paired with said cutter spindles, means for adjusting one of said spindles transversely of the axis about which said turret rotates, means for adjusting one of said spindles about an axis normal to the axis about which said turret rotates, independent means for rotating each pair of cutter and work spindles at predetermined speeds relative to each other, and means for producing a relative feed movement between said spindles.

8. In a machine of the character described, the combination of a base, a turret rotatably supported by said base, means for rotating said turret, a plurality of cutter spindles rotatably supported by said turret, the axis of said cutter spindles being parallel with the axis about which said turret rotates, a plurality of work spindles rotatably supported by said turret, said work spindles being paired with said cutter spindles, means for adjusting one of said spindles transversely of the axis about which said turret rotates, means for adjusting one of said spindles about an axis normal to the axis about which said turret rotates, independent means for rotating each pair of cutter and work spindles at predetermined speeds relative to each other, and a common means for producing a relative feed movement between said spindles.

9. In a machine of the character described, the combination of a base, a turret rotatably supported by said base, means for rotating said turret, a plurality of cutter spindles rotatably supported by said turret, face type cutters supported on said cutter spindles, the axis of said cutter spindles being parallel with the axis about which said turret rotates, a plurality of work spindles rotatably supported by said turret, said work spindles being paired with said cutter spindles, means for adjusting one of said spindles transversely of the axis about which said turret rotates, means for adjusting one of said spindles about an axis normal to the axis about which said turret rotates, and means for rotating each pair of said cutter and work spindles at predetermined speeds relative to each other.

10. In a machine of the character described, the combination of a base, a turret rotatably supported by said base, means for rotating said turret, a plurality of cutter spindles rotatably supported by said turret, a plurality of work spindles rotatably supported by said turret, said work spindles being paired with said cutter spindles, means for adjusting one of said spindles transversely of the axis about which said turret rotates, means for adjusting one of said spindles about an axis normal to the axis about which said turret rotates, and independent means for rotating each pair of cutter and work spindles at predetermined speeds relative to each other.

11. In a machine of the character described, the combination of a base, a turret rotatably supported by said base, means for rotating said turret, a plurality of gear cutting units mounted on said turret, each of said units including a cutter spindle a work spindle and a motor adapted to rotate said spindles at predetermined relative speeds, means for adjusting one spindle of each unit transversely of said turret axis, and means for adjusting the other of said spindles about an axis normal to said turret axis.

12. In a machine of the character described, the combination of a base, a turret rotatably supported by said base, means for rotating said turret, a plurality of gear cutting units mounted on said turret, each of said units including a cutter spindle a work spindle and a motor adapted to rotate said spindles at predetermined relative speeds, means for adjusting one of said spindes of each unit transversely of said turret axis, means for adjusting the other of said spindles about an axis normal to said turret axis, and means adapted to produce a relative feed movement between said spindles controlled by the rotation of said turret.

13. In a machine of the character described, the combination of a base, a turret rotatably supported by said base, means for rotating said turret, a plurality of cutter spindles rotatably supported by said turret, the axis of said cutter spindles being parallel with the axis about which said turret rotates, a plurality of work spindles rotatably supported by said turret, said work spindles being paired with said cutter spindles, means for adjusting the axis of said work spindle about an axis normal to the axis about which said turret rotates, means for rotating each of said cutter spindles and for rotating said work spindles at predetermined speeds relative to the cutter spindles with which they are paired, and a common cam for producing a feed movement between said spindles upon rotation of said turret.

14. In a machine of the character described, the combination of a base, a turret rotatably supported by said base, means for rotating said turret, a plurality of cutter spindles rotatably supported by said turret, means for supporting a face type tool on each of said cutter spindles, a plurality of work spindles rotatably supported by said turret, said work spindles being paired with said cutter spindles, means for rotating said cutter and work spindles at predetermined speeds, and means for producing relative feed movement between the cutter and work spindles of each of said pairs.

15. In a machine of the character described, the combination of a frame, a tool spindle rotatably supported by said frame, means for supporting a face type tool on one end of said tool spindle, a work spindle rotatably supported by said frame, means for attaching a work blank on one end of said work spindle, means for rotating said tool spindle, means for rotating said work spindle in predetermined timed relation to the rotation of said tool spindle, and means for producing relative straight line movement between said spindles.

16. In a machine of the character described, the combination of a frame, a tool head movably supported by said frame, means for moving said tool head, a tool spindle rotatably supported by said tool head, means for supporting a face type tool on said tool spindle, a work head movably supported by said frame, a work spindle rotatably supported by said work head, means for rotating said tool and work spindles at predetermined relative speeds, and means for producing relative straight line movement between said spindles.

17. In a machine of the character described, the combination of a frame, a tool head movably supported on said frame, a tool spindle rotatably supported by said tool head, means for supporting a face type tool upon one end of said tool spindle, a work head movably supported by said frame, a work spindle rotatably supported by said work head, means for rotating said tool and work spindles at predetermined relative speeds, means for producing relative adjustment of said spindles axially of each other, means for producing angular adjustment of said spindles relative to each other, and means for producing lineal movement of said spindles relative to each other in a direction parallel to the axis of one of said spindles.

18. In a gear cutting machine, the combination of a frame, a vertical tool spindle rotatably supported by said frame, means for adjusting said tool spindle in a horizontal plane, a work spindle rotatably supported by said frame and angularly adjustable about a horizontal axis, means for rotating said spindles at predetermined relative speeds, means for supporting a face type tool on one end of said tool spindle, means for supporting a work blank on the adjacent end of said work spindle, and means for moving said work spindle vertically to produce a relative feed movement between said spindles.

19. In a gear forming machine of the character described the combination of a base, a turret rotatably supported by said base, means for rotating said turret, a plurality of work supports carried by said turret, a plurality of tool spindles rotatably supported by said turret, said tool spindles being paired with said work supports and having one end thereof adjacent the work support with which it is paired, means for supporting a face type tool on the end of each of said tool spindles adjacent the work support with which it is paired, means for rotating said tool spindles and means for rotating said work supports during the operation of the tools.

20. In a gear forming machine of the character described the combination of a base, a turret rotatably supported by said base, means for rotating said turret, a plurality of work supports carried by said turret, a plurality of tool spindles rotatably supported by said turret, said tool spindles being paired with said work supports and having one end thereof adjacent the work support with which it is paired, means for supporting a face type tool on the end of each of said tool spindles adjacent the work support with which it is paired, means for rotating said tool spindles, means for rotating said work supports during the operation of the tools, and means for producing relative feed movement between said tool spindles and the respective work supports with which they are paired.

21. In a gear cutting machine of the character described the combination of a base, a turret rotatably supported by said base, means for rotating said turret, a plurality of work spindles rotatably supported by said turret, a plurality of tool spindles rotatably supported by said turret, said tool spindles being paired with said work spindles and the spindles of each pair being positioned approximately end to end with an obtuse angle therebetween, means for supporting a face type tool on the end of each of said tool spindles adjacent the work spindle with which it is paired, means for supporting a work blank on the end of each of said work spindles adjacent the tool spindle with which it is paired, means for rotating the tool and work spindle of each pair at predetermined relative speeds and means for producing relative feed movement between the tool and work spindle of each pair.

FRANK H. ADAMS.